April 30, 1946.  E. C. WAHLBERG  2,399,274
ELECTRICAL DEVICE
Original Filed Jan. 15, 1943   3 Sheets-Sheet 2

INVENTOR.
Eric C. Wahlberg
BY Thomas E. Betts
his attorney

April 30, 1946.　　E. C. WAHLBERG　　2,399,274
ELECTRICAL DEVICE
Original Filed Jan. 15, 1943　　3 Sheets-Sheet 3

INVENTOR.
Eric C. Wahlberg
BY Thomas C. Betts
His Attorney

Patented Apr. 30, 1946

2,399,274

UNITED STATES PATENT OFFICE 2,399,274

ELECTRICAL DEVICE

Eric C. Wahlberg, Stamford, Conn., assignor to Electrolux Corporation, Old Greenwich, Conn., a corporation of Delaware Original application January 15, 1943, Serial No. 472,464. Divided and this application December 7, 1945, Serial No. 633,325

10 Claims. (Cl. 172—293)

This application is a division of my copending application Serial No. 472,464, filed January 15, 1943.

The invention relates to electric motors especially adapted for use in a synchronous system.

One of the objects of my invention is to provide electric motors operable on either direct or alternating current and so constructed as to generate larger synchronizing currents for maintaining the motors of the system in synchronism, than has heretofore been possible.

Another object of my invention is to provide an electric motor having improved means by virtue of which its rotor may be angularly positioned with respect to its stator before the motor is started or after it has been stopped.

It is a further object of my invention to provide such a motor which will be suitable for protracted operation on a duty cycle consisting of starting, running and stopping having a much shorter period than that permissible heretofore.

Figure 1:
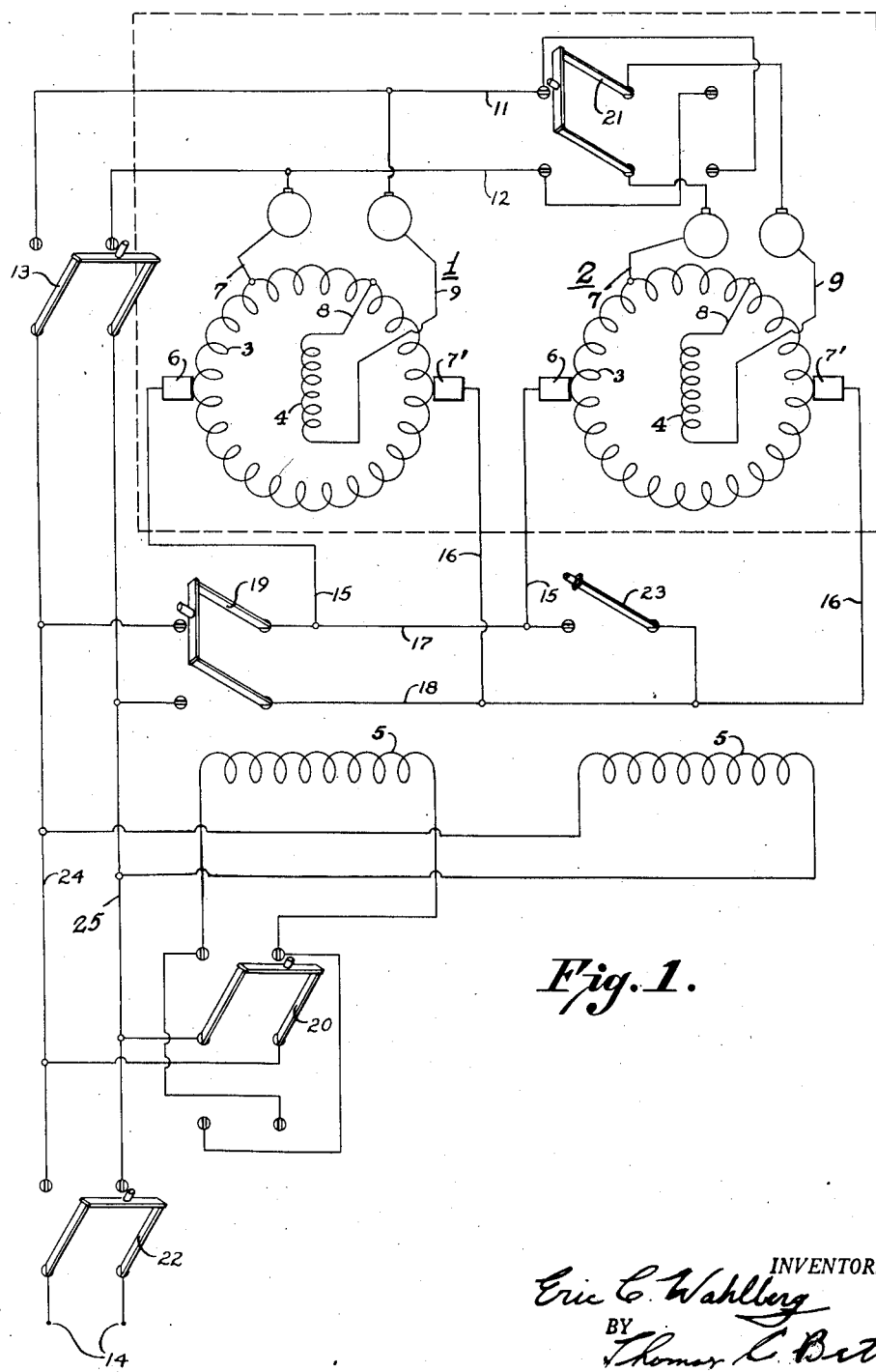
Figure 2:
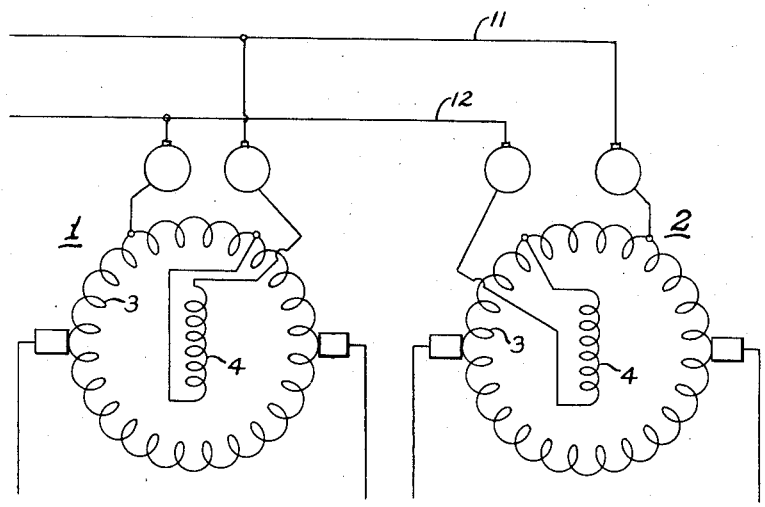
Figure 3:
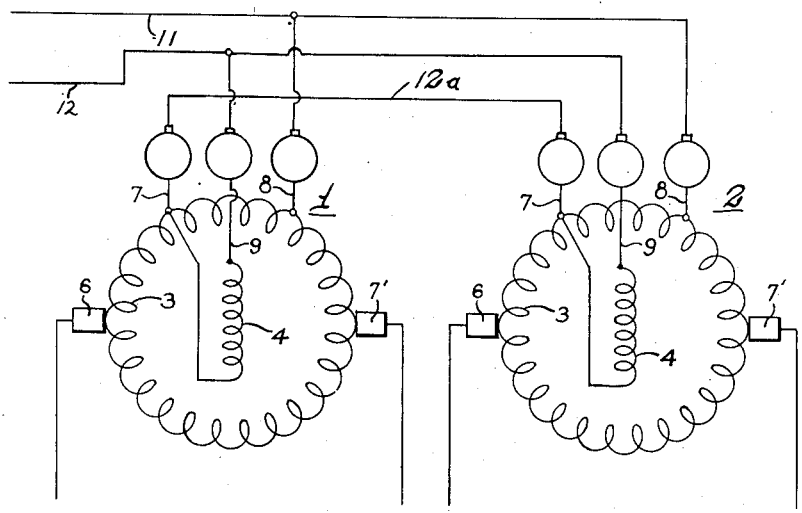
Figure 4:
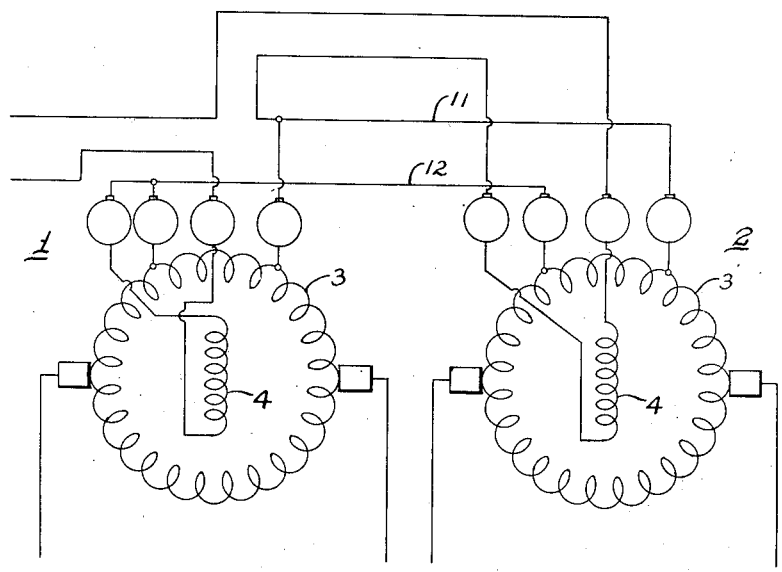

Referring to the drawings forming a part of the specification, there is shown in Fig. 1 a schematic wiring diagram showing the improved system. Figs. 2 through 4 show modified forms thereof.

Referring to Fig. 1, reference characters 1 and 2 designate the armature and field circuits of two electric motors constructed according to my invention. Each motor has a main armature winding 3, an auxiliary armature winding 4, and a field winding 5. The armature windings 3 are represented only schematically and may be of any desired type. For the purposes of illustration, it will be assumed that the windings 3 are distributed windings of the lap winding type common to ordinary direct current electric motors. The auxiliary windings 4 may also be of any suitable type, either distributed or concentrated, but for illustration, it will be assumed that they are in the form of spiral helixes with the conductors occupying slots distributed over the entire armature. The conductors of the auxiliary winding may, if desired, occupy the same slots as the conductors of the main winding. The field windings 5 are also shown schematically. The machines could have any desired number of pairs of poles but for the purposes of illustration, it is assumed that the windings 5 represent the field windings of two-pole machines.

Each of the machines 1 and 2 is provided with a suitable commutator (not shown), to which are connected suitable taps from the main windings 3. Each machine is provided with brushes 6 and 7' which in the actual machine would rest on the commutators of the machines. In the schematic drawings the brushes are shown resting directly on the windings 3. The brushes 6 and 7' of each machine are connected to conductors 15 and 16 and these conductors are connected in parallel with one another by conductors 17 and 18. Conductors 17 and 18 are connected to a D. C. supply 14 through a switch 19. A switch 23 is provided for short circuiting the conductors 17 and 18.

Taps 7 and 8 are taken from the main winding 3 of each machine. One end of each auxiliary winding 4 is connected to a tap 8 and the other end of each auxiliary winding is connected to a conductor 9. The tap 7 and conductor 9 of each machine are connected to slip rings in the manner of a rotary converter. The slip rings of each machine are connected in parallel with those of the other machine by conductors 11 and 12. The conductors 11 and 12 are also connected through a switch 13 to the source of direct current potential 14.

The fields 5 of the machines are connected in parallel and are also connected to the source of direct current 14.

In one form of the invention, as described later, reversing switches 20 and 21 may be provided in the connection of the field windings to the D. C. supply and in the interconnection between the slip rings of the machines respectively. There may also be provided a main switch 22 for controlling the application of power from the D. C. supply 14 to the entire system.

The operation of the system set forth above will now be described. Assume that the reversing switches 20 and 21 are closed to the poles nearest to the illustrated positions of the switches. Assume also that the remaining switches 13, 19, 22 and 23 are open. The switch 22 is first closed to energize the system. The switch 13 should be closed next. This will supply direct current to the armature windings of each of the machines through the taps 7 and conductors 9. The current will flow in parallel paths through the two halves of the main windings between the taps 7 and 8 and thence through the auxiliary windings 4. It is assumed that the main armature winding will produce a flux, the axis of which bisects the angle between the taps 7 and 8, and that the auxiliary windings 4 produce a flux having an axis coinciding with the axis of the flux produced by the main windings. Thus, there will be produced in the armature of each machine a pair of fixed poles. These poles will line up with the main field poles of each machine which are energized by the windings 5. The armature of each machine will thus be brought into the same space relationship with its field poles as that of each of the other machines.

After sufficient time has elapsed to permit the armatures of the machines to be positioned before starting, the switch 13 is opened and the switch 19 is closed. Closure of switch 19 applies direct current through the commutator (not shown) to the main armature windings only of each of the machines and they will accelerate as ordinary direct current motors. During this period there will be alternating current voltages generated between the taps 7 and conductors 9 of each machine. Should one of the machines tend to accelerate faster than the other, its alternating voltages would get out of phase with the alternating voltages of the other machine and also would be of greater magnitude and frequency. This would permit alternating currents to flow between the fast machine and the slow machine and the action of these currents would be to increase the speed of the slow machine and slow down the fast machine until they are again synchronized. When the machines reach normal running speed they will continue to operate in synchronism and any tendency for the machines to get out of step will be opposed by the flow of alternating currents between the machines as described for the acceleration period. The importance of positioning the armatures of the motors before starting lies in the fact that the motors will rarely go into synchronization when started under load if their armatures are not first brought into alignment. Even when started without load the motors will frequently hunt without synchronizing if started from out of phase positions.

When it is desired to stop the machines, the switch 19 is opened and then the switch 13 is closed. The removal of direct current potential from the commutator brushes of the machines causes them to cease to operate as motors and they begin to slow down. As the machines slow down there continue to be alternating voltages generated between the taps 7 and conductors 9 of each machine and should one of the machines tend to slow down faster than the other, there would be a flow of alternating currents between the machines through the conductors 11 and 12 tending to maintain the machines in synchronism just as during the starting and running period. The application of direct current to the slip rings of the machines again produces fixed poles in their armatures as described previously. The flux produced by the poles in the armature cuts the coils of the field windings 5 as the armatures rotate relatively thereto. This generates alternating voltages in the field coils 5 and should the machines tend to get out of synchronism, there will be a flow of synchronizing alternating currents between the field windings 5 which will aid the alternating currents flowing in conductors 11 and 12 in maintaining the machines in step. Because of this additional synchronizing connection between the machines, they can be maintained in step down to at least the last half revolution of the stopping period.

The alternating voltages generated in the field coils 5 may also cause currents to flow through the low resistance paths provided by the armatures of the several machines to which they are connected by the main power lines 24 and 25 and also through the armatures or other windings of the apparatus forming the direct current supply 14. This flow of alternating current from the field coils through the armatures of the machines will consume energy which must be supplied by the kinetic energy of rotation of the armatures and hence produces a dynamic braking of the machines.

There will be a further dynamic braking action due to the generation of alternating voltages between the taps 7 and conductors 9 of the armature windings which will cause a flow of alternating currents through the field windings 5 of the machines to which they are connected by conductors 24 and 25 and also through the windings of the apparatus constituting the source of direct current 14.

To supplement the dynamic braking action due to the flow of alternating currents as described above, the switch 23 may be closed during the stopping period. Preferably the switch 23 is closed at the same time switch 13 is closed. Closure of switch 23 will provide a short circuit path for the flow of direct current between the brushes 6 and 7' of each of the machines. The provision of this additional path for the flow of dynamic braking currents considerably reduces the deceleration time of the machines.

The quick stopping of the machines due to dynamic braking reduces the period of time during which the machines have an opportunity to get out of step. This, in combination with the strong synchronizing action due to the flow of alternating currents between the field windings and between the armature windings of the machines, as previously described, effectively maintains synchronism of the machines at least down to the last half revolution of the stopping period. Should the machines tend to get out of step during the last half revolution of their operation, they will be brought back into synchronism by the action of the fixed armature poles tending to line up with the fixed poles of the main field, just as during the initial alignment of the armatures of the machines prior to the starting thereof.

Since the armatures of the motors are thus brought to rest in exact alignment, it is unnecessary to position them again before starting unless they have been disturbed in the interim. Hence, in some applications it is only necessary to apply direct current to the slip rings during the stopping period. On the other hand there are applications in which it is immaterial whether or not the motors are brought to rest in synchronization, and in such cases direct current need be applied to the slip rings to position the armatures only before the motors are started and not during the stopping period.

It is to be noted from the above described operation of the system of synchronized motors according to this invention, that only two wires are used to interconnect the alternating current sides of the motors, and hence each motor requires only two slip rings. The system disclosed in my prior application Serial No. 428,018, filed January 24, 1942, used three wires interconnecting the alternating current sides of the machines. The third wire has since been found unnecessary and its elimination makes the system much more desirable, both from the motor manufacturing standpoint and that of the user.

The purpose of the auxiliary armature windings 4 will now be considered. By the use of these auxiliary windings, the magnitude of the current flowing in the main field winding when the switch 13 is closed is reduced because of the resistance of the auxiliary winding 14. However, the auxiliary winding 14 being wound on the same core as the main armature winding 3 produces additional ampere turns which balance the reduction in ampere turns of the combined armature windings that was caused by the reduction in the magnitude of the current. In this manner the same strength of fixed poles may be produced on the armatures of the machines without unduly heating the main armature winding. This permits the machines to be operated on a faster cycle of starting, running and stopping without overheating and also reduces the size of relays necessary to carry on the switching operations.

An additional advantage of the auxiliary windings is that whenever the armatures are rotating there are alternating potentials generated in them. Since the auxiliary winding is wound so that its magnetic flux is in the same direction as that produced by the main winding when the motors are connected to direct current for positioning, it is obvious that the alternating voltages generated in them when moving are likewise additive. Hence, it is possible to have a much higher synchronizing voltage by using the auxiliary windings than could be obtained by tapping into the main windings alone. By using high voltages in the synchronizing connection it is apparent that larger synchronizing current will flow between the machines for any given difference in phase between their armatures. Thus, by using the auxiliary winding closer synchronous operation is obtained for a given difference in loads on the motors.

The purpose of the reversing switches 20 and 21 will now be disclosed. In the manufacture of electric machinery it is desirable that all units be manufactured in the same way if possible, regardless of the use to which they are to be put. This means that the same connections will be made between the armature and the slip rings and between the armature and brushes and generally between the internal windings of the machines and the external connection leads. Likewise, it is desirable that the mounting brackets for all of the motors be constituted in a like manner. There are occasions in the use of synchronous machines, such as those described, in which the apparatus to which they are connected must be driven in opposite directions even though the apparatus should otherwise be driven synchronously. The switches 20 and 21 shown in the schematic diagram of Fig. 1 are merely to indicate that by reversing both the field connections to one of the motors and the connections between the alternating current sides of the machines they may be maintained in synchronism although driven in opposite directions. The same result could also be obtained by reversing the connection to one of the main armature windings from the D. C. supply instead of reversing the field connections. The switches need not actually be used in practice, having been illustrated merely to indicate how the connections should be changed.

Reference should now be made to Figs. 2, 3 and 4 of the drawings. In these figures there are shown modified connections between the armature windings of the machines 1 and 2. Since the rest of the connections are the same as shown in Fig. 1, they have been omitted. To form a complete circuit, the portion of the circuit shown in any of Figs. 2, 3 and 4 may be substituted for the box formed by dashed lines.

In the circuit shown in Fig. 2, the auxiliary winding 4 has been placed in series with the tap 7 from the armature winding of machine 2 instead of in series with the tap 8. With this arrangement, balanced currents flow in the lines 11 and 12 interconnecting the alternating current sides of the machines. The operation is otherwise the same as that of the circuit shown in Fig. 1.

In Fig. 3, the auxiliary windings 4 have been connected in parallel with one another between the conductor 12 from the main power source and a conductor 12a. The portions of the main armature windings 3 included between the taps 7 and 8 of the two motors are connected in parallel with each other between the conductors 11 and 12a. The synchronizing currents developed in said portions of the main armature windings and in the auxiliary windings, respectively, thus flow through parallel paths and hence there is less resistance to the flow of these currents between the motors. The operation of the circuit is otherwise the same as the operation described in connection with Fig. 1.

In Fig. 4, the auxiliary winding 4 of machine 1 is connected in series with the main power line going to conductor 12, the same as in Fig. 3. The auxiliary winding 4 of machine 2, however, is connected in series with the main power line leading to conductor 11. With this arrangement, a result similar to that obtained with the Fig. 3 circuit is obtained but there is a reduction in the magnitude of the current flowing to the armatures of the machines during the stopping period. Such an arrangement may be desirable to balance the available voltage supply to the resistance of the particular main armature windings selected.

In the description of the invention just set forth, manual operation of the various switches 13, 19 and 23 was described. It should be understood, however, that these switches or their equivalents may be operated automatically in the manner set forth in the previous application Serial No. 428,018. Furthermore, while the field windings of the machines have been shown connected in parallel and connected to the same source of supply as the armatures of the machines, they may if desired, be connected in series and/or connected to a separate source of power. Such connections have not been illustrated in this application as a full description thereof appears in the prior application Serial No. 428,018, referred to above.

It should also be pointed out that two of the principal features of the invention set forth in this application, namely, two wire synchronization and the use of the auxiliary winding, are equally as applicable to alternating current machines as to direct current machines, and as a matter of fact, the motors illustrated are of the universal type, and hence will operate satisfactorily on either alternating or direct current. To obtain full benefits of the two wire system in alternating current machinery, single phase machines, such as those shown, should be used. With such an arrangement, there need be but two wires interconnecting the machines as the same wires are used during the starting and stopping periods as during the running period. During positioning, if alternating current is employed, the polarities of the field poles are reversed in accordance with the frequency of the current, but at the same time the polarities of the relatively fixed poles established in the armatures are likewise reversed in the same manner and consequently the armatures are positioned relative to their fields when using alternating current in the same manner as described for direct current operation.

From the description of this invention as set forth above, it is believed that the manner of obtaining all of the objects set forth in the first part of the specification will be apparent. While preferred embodiments of the invention have been described, it is understood that this was for purposes of illustration only and that many changes and modifications may be made therein. It is intended to cover by these Letters Patent all forms of the invention falling within the scope of the appended claims.

What I claim is:

1. In an electric motor, a stator winding, a main rotor winding, means for supplying current to said main rotor winding, an open auxiliary rotor winding, an electrical connection between said auxiliary winding and an intermediate tap on said main winding, a plurality of slip rings, and conductor means including a section of the main winding connecting the opposite ends of said auxiliary winding to said slip rings.

2. In an electric motor, a stator winding, a main rotor winding, means for supplying current to said main rotor winding, an auxiliary rotor winding, an electrical connection between one end of said auxiliary winding and a tap located at an intermediate point on said main winding, a pair of slip rings, an electrical connection between the other end of said auxiliary winding and one of said slip rings, and an electrical connection between the other slip ring and a tap on said main winding.

3. In an electric motor, a stator winding, a main rotor winding, means for supplying current to said main rotor winding, an auxiliary rotor winding, a pair of taps located at intermediate points on said main winding, an electrical connection between one of said taps and one end of said auxiliary winding, a slip ring connected to the other of said taps, and a slip ring connected to the other end of said auxiliary winding.

4. In an electric motor, a stator winding, a main rotor winding, means for supplying current to said main rotor winding, an auxiliary rotor winding, a pair of taps on said main winding, said auxiliary winding being so located with respect to the portion of said main winding included between said taps that the axes of the magnetic poles produced by said auxiliary winding and by said portion of the main winding substantially coincide, an electrical connection between one of said taps and one end of said auxiliary winding, a slip ring connected to the other of said tapes, and a slip ring connected to the other end of said auxiliary winding.

5. In an electric motor, a stator winding, a main rotor winding, means for supplying current to said main rotor winding, an open auxiliary rotor winding, a pair of taps on said main winding spaced less than 180 electrical degrees apart, and electrical connection between one of said taps and one end of said auxiliary winding, a slip ring connected to the other of said taps, and a slip ring connected to the other end of said auxiliary winding.

6. In an electric motor, a stator winding, a main rotor winding, means for supplying current to said main rotor winding, an auxiliary rotor winding, a pair of taps on said main winding spaced less than 180 electrical degrees apart, said auxiliary winding being so located with respect to the portion of said main winding included between said taps that the axes of the magnetic poles produced by said auxiliary winding and by said portion of the main winding substantially coincide, an electrical connection between one of said taps and one end of said auxiliary winding, a slip ring connected to the other of said taps, and a slip ring connected to the other end of said auxiliary winding.

7. In an electric motor, a stator winding, a main rotor winding, means for supplying current to said main rotor winding, an auxiliary rotor winding, a pair of taps on said main winding, an electrical connection between one of said taps and one end of said auxiliary winding, a first slip ring connected to said one tap, a second slip ring connected to the other end of said auxiliary winding, and a third slip ring connected to the other of said taps.

8. In an electric motor, a stator winding, a main rotor winding, means for supplying current to said main rotor winding, an auxiliary rotor winding, a pair of taps on said main winding, said auxiliary winding being so located with respect to the portion of said main winding included between said taps that the axes of the magnetic poles produced by said auxiliary winding and by said portion of the main winding substantially coincide, an electrical connection between one of said taps and one end of said auxiliary winding, a first slip ring connected to said one tap, a second slip ring connected to the other end of said auxiliary winding, and a third slip ring connected to the other of said taps.

9. In an electric motor, a stator winding, a main rotor winding, means for supplying current to said main rotor winding, an auxiliary rotor winding, a pair of taps on said main winding spaced less than 180 electrical degrees apart, said auxiliary winding being so located with respect to the portion of said main winding included between said taps that the axes of the magnetic poles produced by said auxiliary winding and by said portion of the main winding substantially coincide, an electrical connection between one of said taps and one end of said auxiliary winding, a first slip ring connected to said one tap, a second slip ring connected to the other end of said auxiliary winding, and a third slip ring connected to the other of said taps.

10. In an electric motor, a stator winding, a main rotor winding, means for supplying current to said main winding, an open auxiliary rotor winding electrically connected to said main winding, a plurality of slip rings, means for connecting one of said slip rings to an intermediate point of said main winding, and means for connecting another of said slip rings to said auxiliary winding.

ERIC C. WAHLBERG.